United States Patent [19]
Duffy et al.

[11] Patent Number: 5,000,044
[45] Date of Patent: * Mar. 19, 1991

[54] FLUID LEVEL SENSOR

[76] Inventors: Dennis M. Duffy, 10038 N. 49th Dr., Glendale, Ariz. 85301; Gary G. Small, 15701 E. Page, Gilbert, Ariz. 85234

[*] Notice: The portion of the term of this patent subsequent to Oct. 19, 2006 has been disclaimed.

[21] Appl. No.: 876,454

[22] Filed: Jun. 20, 1986

Related U.S. Application Data

[62] Division of Ser. No. 752,235, Jul. 3, 1985, Pat. No. 4,610,165.

[51] Int. Cl.⁵ .................. G01F 23/32; G01F 23/36
[52] U.S. Cl. ..................... 73/317; 73/305; 73/308; 73/322.5
[58] Field of Search ............ 73/49.2 T, 305, 307, 73/308, 313, 314, 317, 318, 322.5, DIG. 5; 33/366, 378; 116/110, 111, 227, 228; 138/44; 340/612, 618, 623, 625

[56] References Cited

U.S. PATENT DOCUMENTS

| | | | |
|---|---|---|---|
| 274,833 | 3/1883 | Shepardson | 73/322.5 |
| 1,619,339 | 3/1927 | Fredericks | 116/110 |
| 2,525,874 | 10/1950 | De Larzelere | 138/44 |
| 3,921,672 | 11/1975 | Arnold | 138/42 |
| 4,086,457 | 4/1978 | Niedermeyer | 200/84 R |
| 4,105,721 | 8/1978 | Schliebe | 261/76 |
| 4,135,548 | 1/1979 | Sears | 137/392 |
| 4,353,245 | 10/1982 | Nicolai | 73/49.2 T |
| 4,386,525 | 6/1983 | Mooney | 73/49.2 T |
| 4,453,400 | 6/1984 | Senese et al. | 73/49.2 T |
| 4,505,148 | 3/1985 | Zajac | 73/49.2 T |
| 4,531,299 | 7/1985 | Wolfe et al. | 33/366 |
| 4,540,891 | 9/1985 | Keener et al. | 307/118 |

FOREIGN PATENT DOCUMENTS

| | | | |
|---|---|---|---|
| 123460 | 10/1984 | European Pat. Off. | 33/366 |
| 1180960 | 11/1964 | Fed. Rep. of Germany | 73/308 |
| 720 | 1/1983 | Japan | 73/308 |
| 588352 | 1/1978 | U.S.S.R. | 73/308 |
| 802797 | 2/1981 | U.S.S.R. | 73/305 |
| 451134 | 7/1936 | United Kingdom | 73/305 |

OTHER PUBLICATIONS

Sperry Data Sheet 41-5710-09-01, Mar. 1985, "Inclinometer Installation and Specifications" also Data sheet 61-5740-01-00, Jan. 1985—Sperry, Box 21111, Phoenix, Ariz. 85036-1111.
"Why Does A Ship Float" (Explanation of Shift of Center of Buoyancy), *The Way Things Work*, Simon & Schuster 1967, Lib. Cong card #67-27972 (pp. 542, 543).

*Primary Examiner*—William A. Cuchlinski, Jr.
*Assistant Examiner*—W. Morris Worth
*Attorney, Agent, or Firm*—James F. Duffy

[57] ABSTRACT

A pivoted float contains a solid-state inclinometer which produces sensitive electrical output responsive to angular displacement of the float from the direction of gravity. The float is capable of resolving very small changes in liquid level in a vessel, and thereby indicating or warning of small leaks from the vessel.

13 Claims, 1 Drawing Sheet

U.S. Patent    Mar. 19, 1991    Sheet 1 of 1    5,000,044
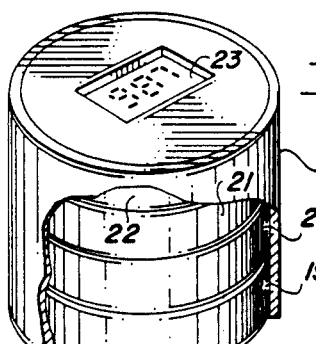
FIG-1
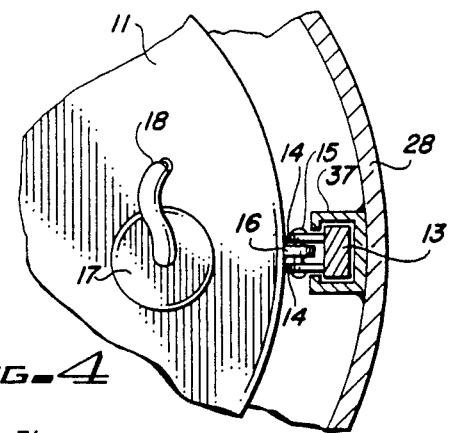
FIG-4
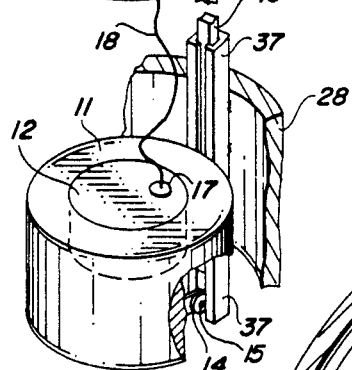
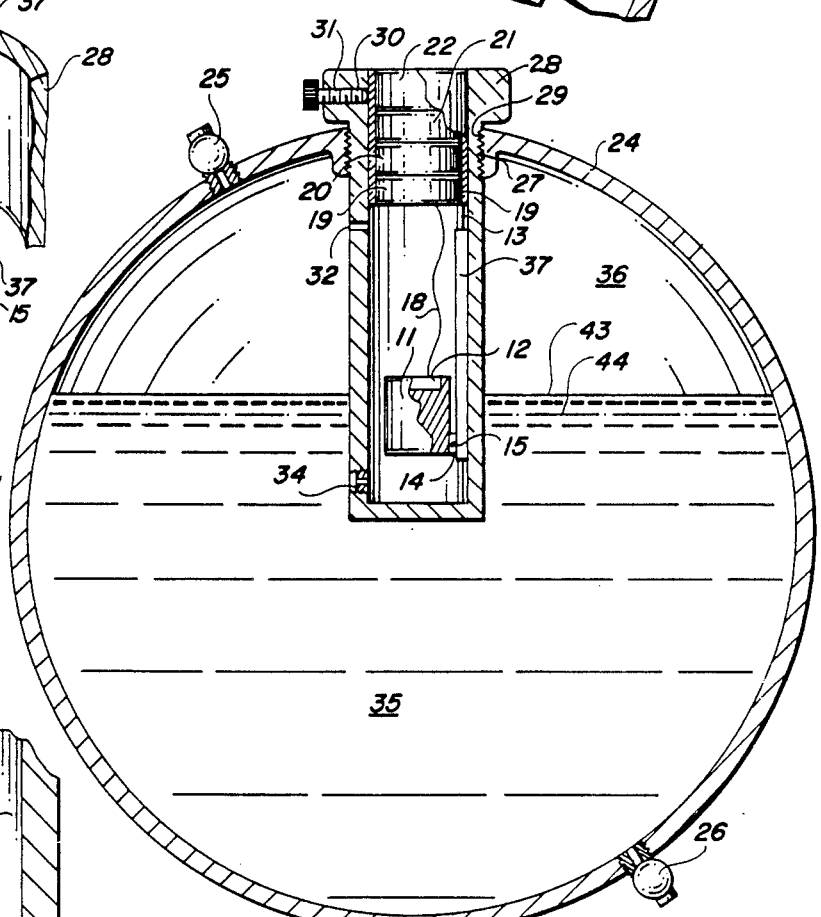
FIG-2
FIG-3
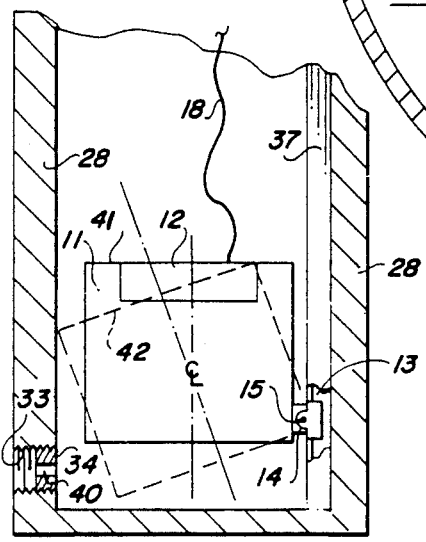
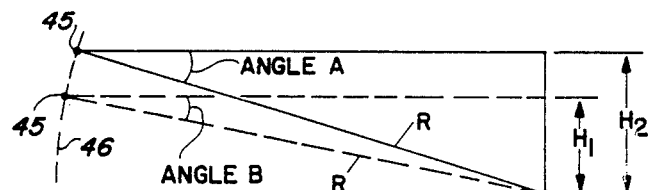
FIG-5

FLUID LEVEL SENSOR

This application is a division of application Ser. No. 752,235, filed July 3, 1985, now U.S. Pat. No. 4,610,165.

TECHNICAL FIELD

The invention relates generally to the sensing of changes of liquid level in vessels such as storage tanks, and more particularly to a highly sensitive sensor which detects minute variations in angular inclination of a pivoting float with respect to the direction of gravity.

BACKGROUND ART

It is desirable that even minute leaks in liquid storage vessels be reliably detected, especially when the liquid is toxic, flammable or otherwise dangerous or highly valuable. A small change in stored liquid volume corresponds to an extremely small change in the quiescent surface level of the stored liquid. Yet a change of a few thousandths of an inch may, in a large vessel, represent a substantial leakage volume.

Prior-art liquid level detectors have attempted various methods of detecting very small changes in the height of a vertically-travelling float. Crude pivoting floats, such as used in automobile gasoline tanks, automobile carburetor float chambers, toilet tanks and the like, have heretofore been incapable of resolving the extremely small angular displacements of a pivoted float necessary for detecting a change in level of only a few thousandths of an inch reliably. The problem has primarily been the lack of a sensing and electrical transducing mechanism not only highly sensitive, but also immune to the various interfering factors, such as temperature, wave motion of the liquid surface, etc. Optical, electromagnetic and other sensing mechanisms each suffer from interfering impingement of the very medium (light, magnetism, etc.) which they are designed to sense. Furthermore, such prior-art level sensors are generally analog responsive to the particular sensed medium, ambient strength or intensity of which may vary to a greater extent than the minute variations sought to be detected.

In a pivoting float type sensor, linearity of the angular sensing transducer mechanism is important if an output is to be derived from which the actual value of level change may be calculated or displayed. Such linearity is of less importance when only a preset threshold angular displacement is to be monitored. One problem in a pivoting float is that the center of buoyancy changes position with inclination in an odd-shaped float, whereas predictability and linearity require that the radius from pivot axis to center of buoyancy remain constant at all angular displacements.

Where a shield, or stilling basin is employed to isolate a sensitive liquid level detector from an ambient surface wave motion of the liquid, it is desirable to be able to select and control the time constant, or rate of ingress and egress of the liquid between the sensitive inner portion of a stilling basin and the larger body of liquid.

Measurement errors of pivoting float type sensors also arise from motion of the vessel itself. Such a problem is evident, for example, in automobile gasoline tank gauges and in carburetor floats not mechanically compensated, during hard cornering, hill-climbing and the like. It is desirable in a sensitive leakage detector application to be able to distinguish between sensor output caused by actual change in liquid level, and that caused by change, even very minute change, in position of the vessel itself.

While a level sensor can indicate a quiescent, desired liquid level at a level somewhat above or below the middle of its measurement range, it is also desirable to be able to make a gross initial height adjustment, over a range considerably wider than the narrow sensor range, to accommodate relatively large differences in initial liquid level before the fine sensing of only thousandths of an inch change in level commences.

It is an object of the invention to provide a fluid level sensor capable of accurate, reproducible and reliable sensing of very minute liquid level changes.

Another object of the invention is to provide a fluid level sensor which senses a readily available medium, which does not rely upon intensity of the measured medium, and which is relatively impervious to variations in ambient intensity of the measured medium.

A further object of the invention is to provide a fluid level sensor relatively immune to wave motion of the liquid, and which provides for selected time constant of response to such wave motion.

Still another object of the invention is to provide a fluid level sensor having an electrical output conveniently convertible to alarm, readout or feedback-control-loop usage.

Another object of the invention is to provide a fluid level sensor having linear or predictable relationship between electrical output signal and actual fluid level in a vessel.

A still further object of the invention is to provide a fluid level sensor capable of sensing and compensating for motion of the liquid storage vessel.

Yet another object of the invention is to provide a fluid level sensor having a gross initial level setting capability considerably wider than the usual sensing range of the operating sensor.

Another object of the invention is to provide a compact, self-contained package containing sensor and related electronics, easily insertable and replaceable in existing storage tanks.

DISCLOSURE OF THE INVENTION

A solid-state inclinometer, which produces a substantial, accurate and reproducible electrical output signal, senses the very small difference between the inclinometer and the direction of gravity. Such inclinometers, exemplified by the Sperry commercially available part numbers PN 02338-03 and -02 are so new to the art that it is believed at the time of filing hereof that any patents pending on the inclinometers themselves have not yet issued. However, their commercial availability demonstrate the feasibility of the solid-state gravitation-direction-detection inclinometer, which has primarily found use thus far in aircraft and space systems.

The inclinometer is, in the present invention, affixed to the interior of a float. The float defines a center of buoyancy in the liquid to be sensed, and is pivoted at a defined distance from the center of buoyancy. The pivot is disposed at a defined spatial relationship to the vessel, such that the float inclines upward and downward as the change in fluid level raises or lowers the center of buoyancy with respect to the pivot. A float support, in one embodiment, couples the pivot to the vessel. In another embodiment, the float is contained within a stilling basin, and the pivot support is spatially coupled to the vessel by virtue of affixation to the stilling basin, which is in turn affixed to the vessel.

The stilling basin is a chamber surrounding the float, into which the liquid can flow through a restricted orifice, thereby slowing and reducing the momentary effects of wave motion in the larger body of fluid outside the stilling basin. In one embodiment, replaceable calibrated orifices are provided so that the degree of flow may be selected.

The electrical output of the inclinometer connects through umbilical wiring to various signal processing electronics, which in various embodiments calculates, triggers an alarm, drives a visual display, or operates valves replenishing or draining liquid so as to maintain a more constant level.

In one embodiment, the entire electronics package is mechanically coupled to the float support and to the float, and releasably slides within a tubular float chamber to be set at a desired initial sensing level or height.

In another embodiment, a reference inclinometer is affixed, either directly or through the stilling basin, in fixed angular relationship to the vessel itself. The signal output of the reference inclinometer is compared to the output of the float-borne inclinometer, providing compensation for error caused by motion of the vessel with respect to the direction of gravity.

The problem of varying linearity, or varying sensitivity of inclinometer output to actual fluid level caused by shifting of locus of the buoyancy center as the float's inclination changes, is addressed in an embodiment having a float geometry whose buoyancy center remains a constant distance from the pivot point independent of inclination. One such geometry is a spherical float.

A vent is provided in the stilling basin to equalize pressure changes resulting from ingress or egress of liquid from the stilling basin.

One embodiment employs an inclinometer having an electrical output signal linearly proportional to inclination; in another embodiment the inclinometer output signal is digitally encoded for more convenient interfacing with microprocessors and other digital electronics.

In general, the use of an inclinometer sensitive only to the relative direction of gravity, rather than intensity of any sensed medium, produces a fluid level sensor of excellent sensitivity, reliability, predictability and reproducibility. The prior unavailability of the newly available solid-state inclinometer technology has made possible a pivoting-float type sensor which could not have thus previously been conceived or developed.

BRIEF DESCRIPTION OF THE DRAWINGS

FIG. 1 is a cutaway partial perspective view of the fluid level sensor.

FIG. 2 is a side sectional view of the fluid level sensor installed in a stilling basin within a liquid storage vessel.

FIG. 3 is an enlarged partial sectional view of the view shown in FIG. 2, more clearly showing pivoting action and the selectable orifice.

FIG. 4 is a partial top elevational view showing the float pivotingly supported by the track-mounted sliding float support.

FIG. 5 illustrates the geometric principles involved in relating changed angular inclination to change in fluid level, showing relative positions of the pivot and of the buoyancy center.

BEST MODE FOR CARRYING OUT THE INVENTION

For the purposes of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications of the illustrated device, and such further applications of the principles of the invention as illustrated therein being contemplated as would normally occur to one skilled in the art to which the invention relates.

The invention is generally referred to as number 10. Pivoting float 11 contains within it solid-state inclinometer 12. An example of such a solid state inclinometer is the Sperry PN 02338-03, manufactured by Sperry Aerospace and Marine Group, Sensing Systems, Phoenix, Arizona. The exemplified inclinometer produces a full range linear output voltage of ±3 volts DC from an inclination angle range with respect to the direction of gravity of ±60 degrees.

Float 11 has a float pivot support member 16 which is pivotingly coupled through pivot pin 15 to a corresponding single or clevis-shaped pivot support member 14, which in turn is affixed to float support member 13. In the illustrated embodiment, float support 13 is slidingly engaged captive to track 37, which is attached to the inner wall of stilling basin 28. As will be more clearly illustrated in subsequent figures, float support 13 is, in operation, in a fixed spatial relationship to liquid vessel 24, such that a rising or falling of fluid level within the vessel causes float 11 to pivot upward or downward, thereby inclining or declining the inclinometer and producing an inclinometer output responsive to the liquid level change.

The words "liquid" and "fluid" are used interchangeably throughout the instant application.

Umbilical wiring 18, which in practice should be soft and flexible so as not to impede motion of float 11, provides electrical power to inclinometer 12, and transmits signal from inclinometer 12 through wiring seal 17 to an electronics package comprising reference inclinometer 19, electronics module 20, power supply 21 and visual indicator module 22 having visual display 23. Electronics module 20, depending upon application, may contain amplification, interface circuitry, digital circuitry, and in one embodiment, a microprocessor for analysis or decision-making based upon signals received from inclinometer 11 and from reference inclinometer 19. For example, in the embodiment containing reference inclinometer 19, a microprocessor can perform subtractive or more complex calculations so as to compensate for fluid level measurement error caused by motion of the vessel itself. Reference inclinometer 19 senses only the motion or inclination of the vessel, independent of the fluid level, for purposes of providing such a calculation or correction procedure.

In FIG. 2, an embodiment is shown having a stilling basin 28 partially immersed in liquid 35 within vessel 24. Stilling basin 28 is cylindrical, having threads 29 which screw into and mate with threaded vessel opening 27. Below the liquid level 43, liquid can communicate to the interior of stilling basin 28 through calibrated orifice 34. Pressure relief is provided above the liquid level 43 by vent hole 32. Electronics package comprising elements 19,20,21,22 is shown as a cylindrical module slideable within stilling basin 28, and in spaced relationship to pivot 15 through the length of float support 13 sliding in track 37, which is affixed to an inside wall of stilling basin 37. Thus, it may be seen that raising or lowering the package, 19,20,21,22 causes a corresponding vertical shift in height of pivot 15 relative to liquid level 43, thereby establishing an initial float level by manual adjustment. Once the desired position of said float-supporting structure is set, it is retained by tightening setscrew 31 within threaded hole 30.

When fluid level decreases from its initial level 43 to level 44, float 11 is downwardly inclined, with a corresponding inclinometer output from 12. Inlet valve 25 and outlet valve 26 may be manually controlled, or in one embodiment, electrically controlled by the electronics package so as to form a closed feedback loop maintaining liquid 35 at a constant level within vessel 24.

FIG. 3 more clearly shows calibrated orifice 34 threadedly engaged into threaded hole 33. The size of orifice opening 40 is selected for a desired rate of flow between the interior of stilling basin 28 and the larger body of fluid contained in vessel 24, surface of which may be disturbed by waves and the like. The stilling basin 28 therefore provides a protected region free of such waves for float 11. In FIG. 3, float 11 is shown in a first float position 41 and a second float position (in phantom) 42.

In FIG. 4, float support 13 is seen to be slidingly captive within track 37, which augments rigidity of the structure and reduces measurement error which might be caused by vibration of the slender float support 13.

FIG. 5 serves to illustrate the geometric principle of the invention. In solid lines, a right triangle is formed by pivot 15, center of buoyancy 45 of float 11, radius R and $H_2$, the height of the liquid level 43 above pivot 15. As basic geometric principles dictate, the resultant angle A corresponds to the angular difference between the direction of gravity and centerline CL shown in FIG. 3. In dotted lines, angle B is formed correspondingly when liquid level descends to $H_1$ above pivot 15. Thus, assuming that radius R remains constant, the angular difference between the two corresponding inclinometer inclinations is calculated as follows:

$(H_2 - H_1)$ = change in liquid height $H_2 = R (\sin A)$ $H_1 = R (\sin B)$ therefore, $(H_2 - H_1) = R (\sin A - \sin B)$ As is known in the art, the locus of the center of buoyancy of an irregularly shaped float, such as that illustrated in FIGS. 1-4, shifts in position as the irregularly shaped float changes its angle of inclination, and thus the above calculation is disturbed by change in the value of radius R. One shape of float which maintains constant locus of center of buoyancy would be a sphere (not illustrated, but within the contemplation of the present invention).

Although not shown, a further embodiment contemplated in the present invention is the automatic or remote controlled adjustment of the size of orifice opening 40 by means of solenoids, shutters, irises and the like.

What has been disclosed is a sensitive fluid level sensor which electrically senses the deviation from direction of gravity of a pivoted float at a liquid-gas interface within a storage vessel.

Those skilled in the art will conceive of other embodiments of the invention which may be drawn from the disclosure herein. To the extent that such other embodiments are so drawn, it is intended that they shall fall within the ambit of protection provided by the claims herein.

Having described our invention in such a clear and concise manner in the foregoing description and drawings that those skilled in the art may readily understand and practice the invention, that which we claim is:

1. A fluid level sensor for detecting small changes in the level of fluid in a vessel, said fluid level sensor comprising:

float support means attached to the interior of said vessel;

pivoting float means for floating at a desired depth in a selected liquid, said pivoting float means defining a center of buoyancy, said pivoting float means having pivot means in spaced relationship to said center of buoyancy, said pivot means pivotingly supported by said float support means in spaced relationship to said vessel; and inclinometer means affixed interior or said pivoting float means for producing an electrical signal sensitively responsive to the angular inclination of said pivoting float means with respect to the direction of gravity;

said inclinometer means comprising a solid-state gravitationally responsive inclination sensor having at least one of an electrical output lineally proportional to inclination of said inclinometer from the direction of gravity and a digitally encoded output decodable as inclination of said inclinometer means from the direction of gravity.

2. The fluid level sensor of claim 1 further comprising means for adjusting said spaced relationship of said pivot means to said vessel for setting an initial angular inclination of said pivoting float at said desired depth in said selected liquid within said vessel.

3. The fluid level sensor of claim 1 further comprising means unbilically wired to said inclinometer means for visually indicating changes in inclination of said pivoting float means.

4. The fluid level sensor of claim 1 further comprising means umbilically wired to said inclinometer means for actuating an alarm when changed in inclination of said pivoting float means exceeds a preset value.

5. The fluid level sensor of claim 1 wherein at least one valve affixed to said vessel communicates between the interior of said vessel and at least one of a liquid source and a liquid drain, said fluid level sensor further comprising means umbilically wired to said inclinometer for controlling said at least one valve in response to changes in level of said liquid within said vessel.

6. The fluid level sensor of claim 1 further comprising stilling basin means circumscribing said pivoting float means for limiting disturbance of said angular inclination of said pivoting float means responsive to wave motion of said liquid within said vessel.

7. The fluid level sensor of claim 6 wherein said stilling basin means comprises reservoir means having at least one orifice communicating with said liquid for limited ingress and egress of said liquid, said reservoir means having at least one vent means communicating with a region interior said vessel not comprising said liquid for equalizing pressure within said stilling basin.

8. The fluid level sensor of claim 7 wherein said stilling basin circumscribing said pivoting float means is removeably attached to said vessel.

9. The fluid level sensor of claim 7 wherein said at least one orifice comprises a replaceable calibrated orifice for selectedly controlling the rate of ingress and egress of said liquid between the interior of said stilling basin and the interior of said vessel.

10. The fluid level sensor of claim 7 further comprising means slideably cooperating with an interior surface of said stilling basin for adjusting said spaced relationship of said pivot means to said vessel for setting an initial angular inclination of said pivoting float means at said desired depth in said selected liquid within said vessel.

11. The fluid level sensor of claim 1 further comprising reference inclinometer means immovably affixed to said vessel for producing an electrical signal sensitively responsive to the angular inclination of said vessel with respect to the direction of gravity; and means umbilically wired to said inclinometer means and to said reference inclinometer means for cancelling the effect upon inclination of said pivoting float means of angular inclination of said vessel.

12. The fluid level sensor of claim 11 wherein said reference inclinometer means comprises a solid-state gravitationally responsive inclination sensor having at least one of an electrical output lineally proportional to inclination of said reference inclinometer means from the direction of gravity and a digitally and coded output decodable as inclination of said reference inclinometer from the direction of gravity.

13. The fluid level sensor of claim 1 wherein said center of buoyancy of said pivoting float means is a constant distance from said pivot means independent of angular inclination of said pivoting float means in said selected liquid.

* * * * *